US012797968B2

(12) United States Patent
Happes

(10) Patent No.: US 12,797,968 B2
(45) Date of Patent: Nov. 17, 2026

(54) CARTON HAVING DRILL TEMPLATE ON PANEL

(71) Applicant: Crestron Electronics, Inc., Rockleigh, NJ (US)

(72) Inventor: Marc Happes, Stoughton, MA (US)

(73) Assignee: Crestron Electronics, Inc., Rockleigh, NJ (US)

(*) Notice: Subject to any disclaimer, the term of this patent is extended or adjusted under 35 U.S.C. 154(b) by 351 days.

(21) Appl. No.: 18/422,324

(22) Filed: Jan. 25, 2024

(65) Prior Publication Data

US 2025/0242419 A1 Jul. 31, 2025

(51) Int. Cl.
*B23B 47/28* (2006.01)
*B65D 85/00* (2006.01)

(52) U.S. Cl.
CPC ............ *B23B 47/287* (2013.01); *B65D 85/70* (2013.01)

(58) Field of Classification Search
CPC ...... B23B 47/287; B65D 85/70; B65D 85/68; B65D 2585/6837; B65D 2585/684; B65D 2203/00
See application file for complete search history.

(56) References Cited

U.S. PATENT DOCUMENTS

| | | | | |
|---|---|---|---|---|
| 7,189,034 | B1 | 3/2007 | Zeilinger et al. | |
| 11,414,236 | B2 | 8/2022 | Holley, Jr. | |
| 2012/0252244 | A1* | 10/2012 | Elkins, II | G02B 6/3825 439/215 |
| 2018/0215117 | A1* | 8/2018 | De Boer | B65B 61/025 |
| 2023/0264269 | A1 | 8/2023 | Ciccocioppo | |

OTHER PUBLICATIONS

Website https://afriendlyfox.com/ 2022/05/19/wall-mount-a-tv-into-metal-studs-with-confidence/ (Year: 2022).*

* cited by examiner

*Primary Examiner* — Moshe Wilensky
(74) *Attorney, Agent, or Firm* — CRESTRON ELECTRONICS, INC.

(57) ABSTRACT

A carton holds at least one product. At least one panel encloses an interior of the carton. A drill template is disposed on a surface of the at least one panel. The drill template includes at least one alignment feature configured to permit the drill template to be aligned to a location on a mounting surface upon which the product is to be mounted and at least one indicator of a drilling or cutting location. The carton is configured to, upon removal of the product from the carton, enable an installer to place an opposing surface of the at least one panel against the mounting surface, then align the drill template on the mounting surface using the at least one alignment feature, and thereafter drill or cut into the mounting surface at the location of the at least one indicator.

20 Claims, 6 Drawing Sheets

CARTON HAVING DRILL TEMPLATE ON PANEL

BACKGROUND OF THE INVENTION

Technical Field

The present embodiments relate to a drill template for facilitating the mounting of a product. More particularly, the present embodiments relate to a carton that incorporates a drill template for facilitating the mounting of a product shipped in the carton.

Background Art

In recent years, flat-screen televisions and other displays that are mountable on the walls of a residence, conference room, or other facility have become increasingly popular. Additionally, the mounting or installation of sound bars or other speakers on a wall or in a ceiling, either individually or in combination with a flat-screen television or other display, has also grown.

To mount a display or speaker on a wall or in a ceiling, holes are first drilled into the wall or ceiling at locations where screws will be driven to secure the display or speaker to the wall or ceiling or to secure a mounting bracket to the wall or ceiling. The locations where the holes are to be drilled are usually first determined from measurements, or from the alignment of brackets, carried out by either a customer or an installer on specific locations on the display or speaker bracketry. The weight of the brackets typically preclude such efforts being carried out by one person. Further, the taking of measurements, may be prone to errors, which can lead to incorrect determinations of where the holes are to be drilled, which then leads to incorrect mounting of the display or speaker. As a result, the measurements and the mounting of the display or speaker may need to be redone before the product is correctly installed.

To more quickly and more accurately locate where the holes are to be drilled, a drill template may be provided with the product or may be made by the installer or customer. The drill template may be used to more readily locate the positions where the holes are to be drilled by first aligning the template to the wall or ceiling and then using the template to mark the drill locations on the wall or ceiling. Thus, the template may be used to minimize the number of measurements needed. The template also provides consistent results which minimize the chances that the customer or installer will incorrectly determine the position of the drill holes.

Typically, when provided with the product, the template is shipped within the carton in which the product is shipped or as a separate item within an external shipping carton which also holds the carton which contains the product. Therefore, the possibility exists that a customer or installer may not be able to locate the drill template from among the items shipped together with the product or may accidentally discard the template. For example, when the product is a display or speaker, various connectors, brackets, and other accessories may be shipped with the display or speaker, which increases the likelihood that an individual item, such as the drill template, may be overlooked or discarded.

It is therefore desirable to provide a drill template in a manner that is less likely to be overlooked or discarded as well as which provides other advantages.

SUMMARY OF THE INVENTION

It is to be understood that both the general and detailed descriptions that follow are exemplary and explanatory only and are not restrictive.

DISCLOSURE OF INVENTION

In accordance with an aspect, a carton for holding at least one product comprises (a) at least one panel enclosing an interior of the carton; and (b) a drill template disposed on a surface of the at least one panel, the drill template including (1) at least one alignment feature configured to permit the drill template to be aligned to a mounting surface upon which the product is to be mounted, and (2) at least one indicator of a drilling or cutting location; (c) wherein (1) the carton is configured to, upon removal of the product from the carton, enable an installer to place an opposing surface of the at least one panel against the mounting surface, then align the drill template on the mounting surface using the at least one alignment feature, and thereafter drill or cut into the mounting surface at the location of the at least one indicator.

According to a further aspect, a carton for holding at least one product comprises (a) a plurality of panels enclosing an interior of the carton; and (b) a drill template disposed on an inner surface of a top panel of the plurality of panels, the drill template including (1) at least one alignment feature configured to permit the drill template to be aligned to a mounting surface upon which the product is to be mounted, and (2) at least one indicator of a drilling or cutting location on the mounting surface; (c) wherein (1) the carton is configured to, upon removal of the product from the carton, enable an installer to place an outer surface of the top panel against the mounting surface, then align the drill template on the mounting surface using the at least one alignment feature, and thereafter drill or cut into the mounting surface at the location of the at least one indicator, and (2) the carton is further configured to receive debris generated during the drilling or cutting into the mounting surface.

According to a still further aspect, a carton for holding at least one product comprises (a) a plurality of panels enclosing an interior of the carton, the plurality of panels including a top panel, a bottom panel, a pair of opposing side panels disposed between the top panel and the bottom panel, and a pair of opposing end panels disposed between the top panel and the bottom panel and between pair of opposing side panels; and (b) a drill template disposed on an inner surface of the top panel, the drill template including (1) at least one horizontal alignment feature configured to permit the drill template to be aligned horizontally to a mounting surface upon which the product is to be mounted, (2) at least one vertical alignment feature configured to permit the drill template to be aligned vertically to the mounting surface, (3) a plurality of indicators identifying a corresponding plurality of drilling or cutting locations on the mounting surface, each one of the plurality of indicators being at least one of a marking, an opening, or a removable region, (4) a plurality of cutout locations, and (5) a plurality of perforations each surrounding a corresponding removable region of the drill template; and (c) at least one adhesive strip located on at least the outer surface of the at top panel; (d) wherein (1) the carton is configured to, upon removal of the product from the carton, enable an installer to place the outer surface of the top panel against the mounting surface, then horizontally and vertically align the drill template on the mounting surface using the at least one horizontal and the at least one vertical alignment features, and thereafter drill or cut into the mounting surface at the locations of the plurality of indicators, and (2) the carton is further configured to receive debris generated during the drilling or cutting into the mounting surface.

BRIEF DESCRIPTION OF DRAWINGS

The accompanying figures further illustrate the present embodiments.

The components in the drawings are not necessarily drawn to scale, emphasis instead being placed upon clearly illustrating the principles of the present embodiments. In the drawings, like reference numerals designate corresponding parts throughout the several views.

BRIEF DESCRIPTION OF THE SEVERAL VIEWS OF THE DRAWING

Figure 1:
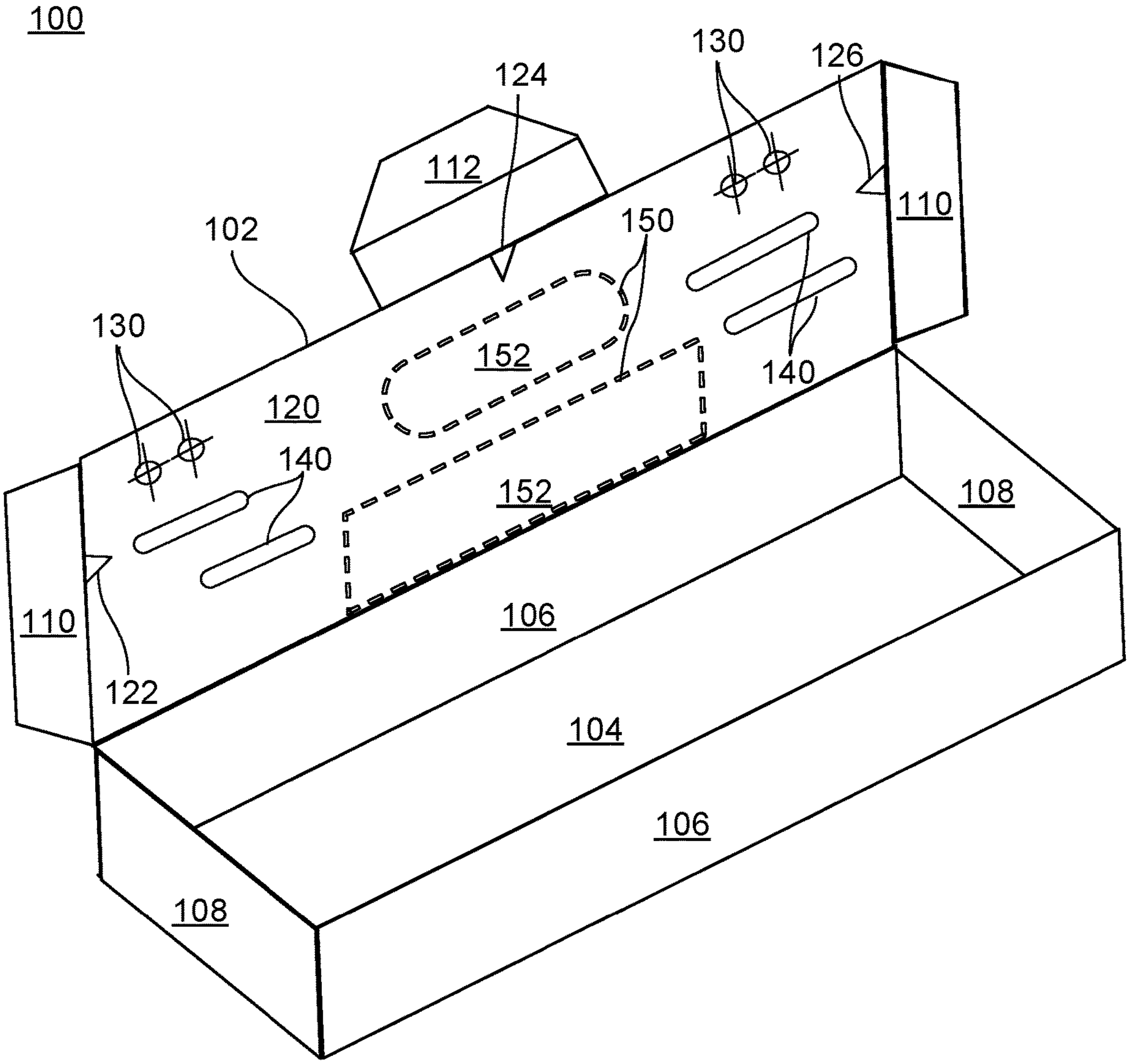

FIG. 1 is an isometric view of an open carton having a drill template located on an inner surface of a top panel in accordance with an embodiment.

Figure 2:
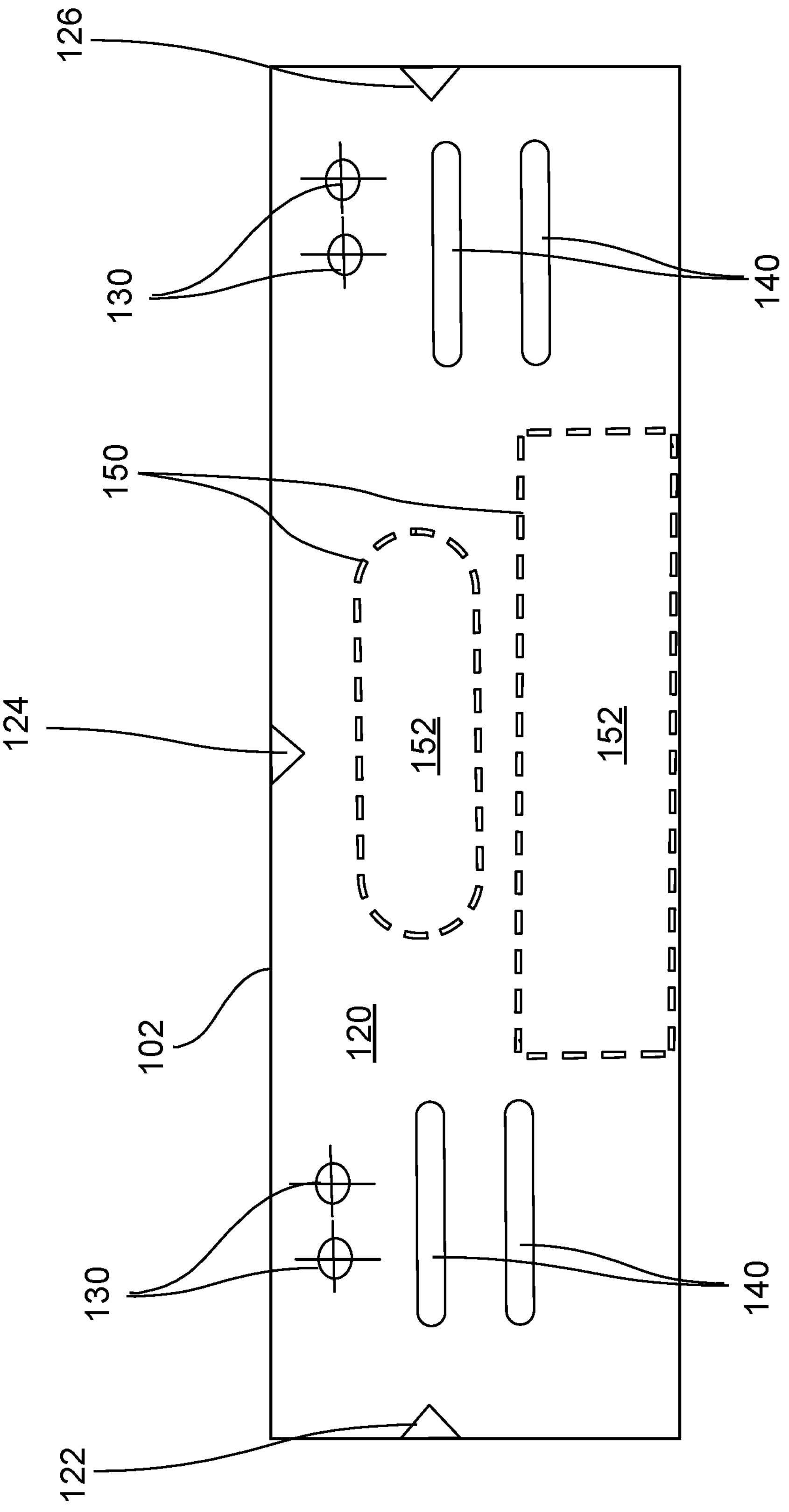

FIG. 2 is an enlarged view of the inner surface of the top panel of FIG. 1.

Figure 3:
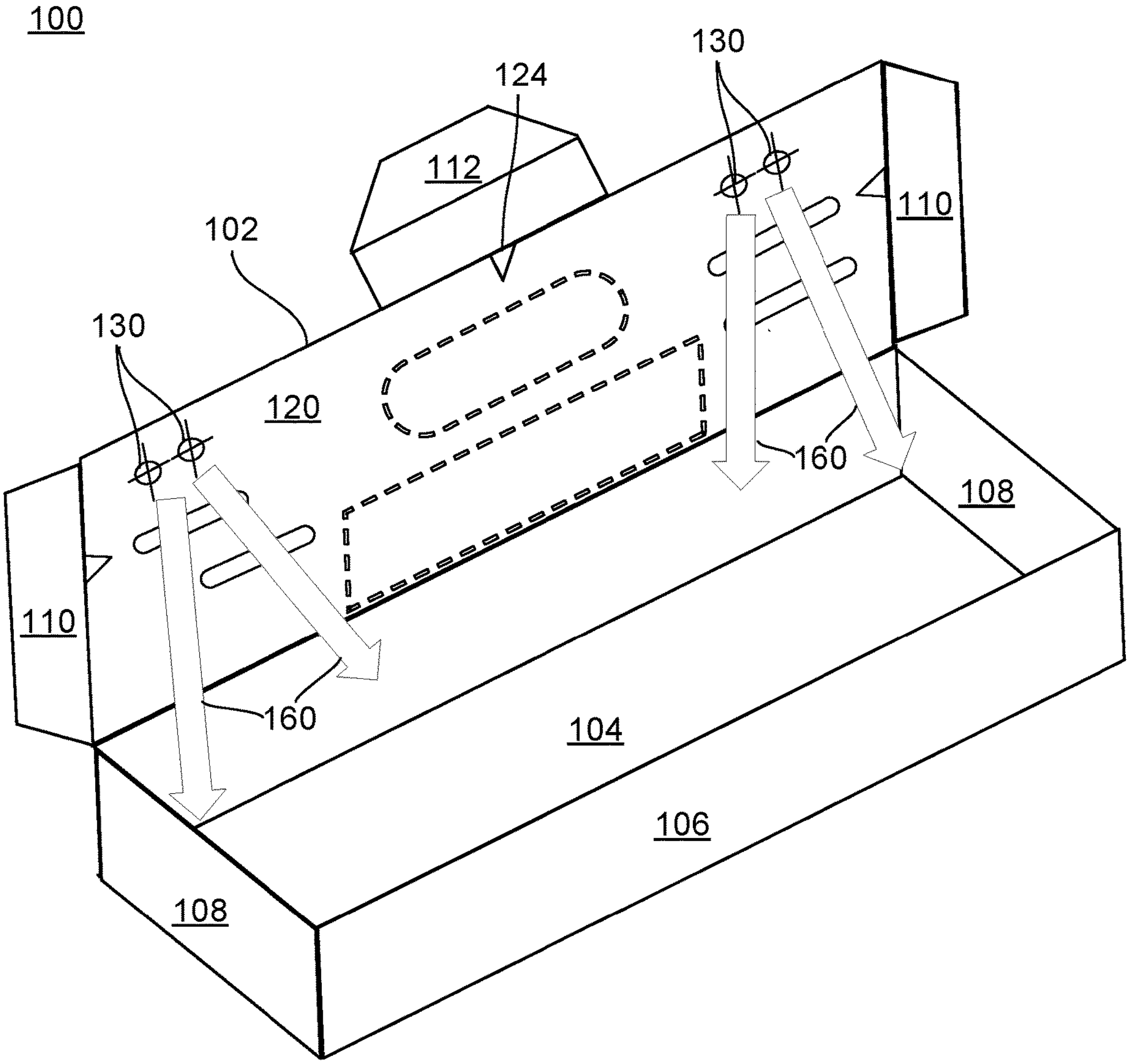

FIG. 3 is another isometric view of the carton of FIG. 1.

Figure 4:
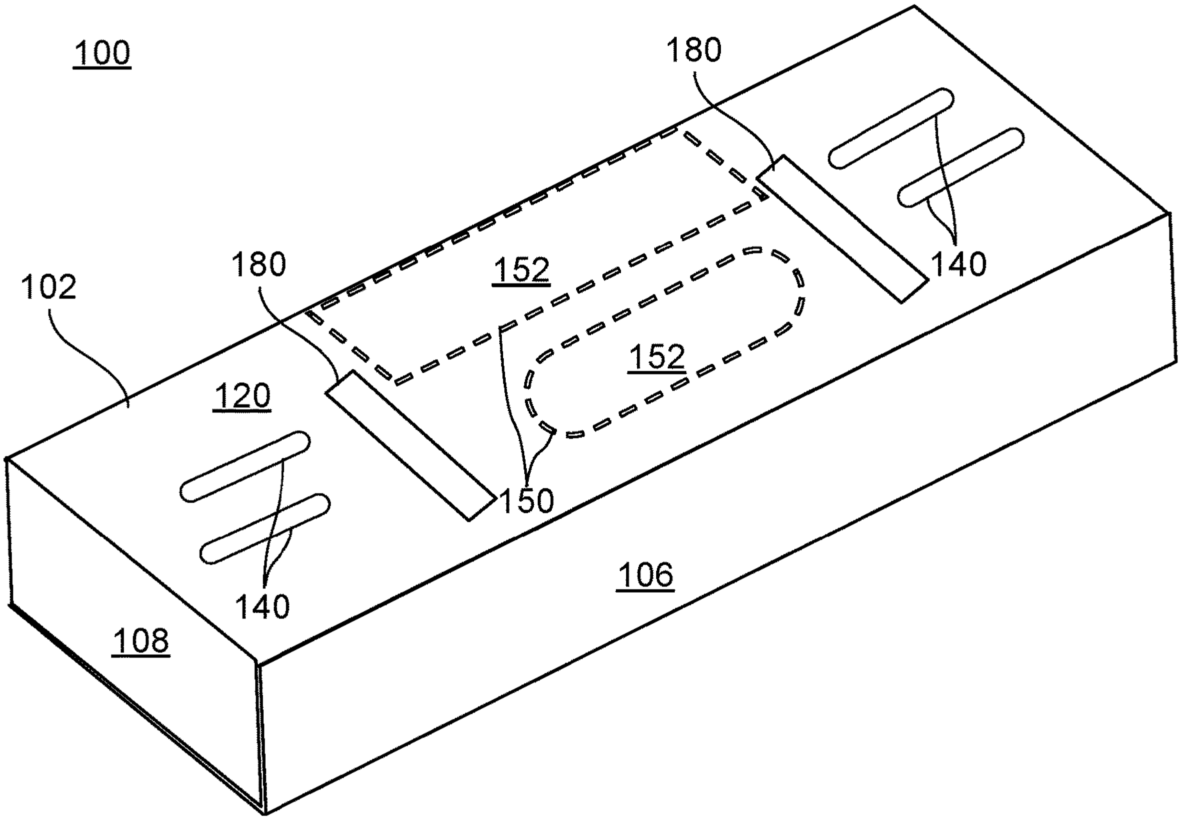

FIG. 4 is an isometric view of the carton of FIGS. 1-3 showing the carton closed.

Figure 5:
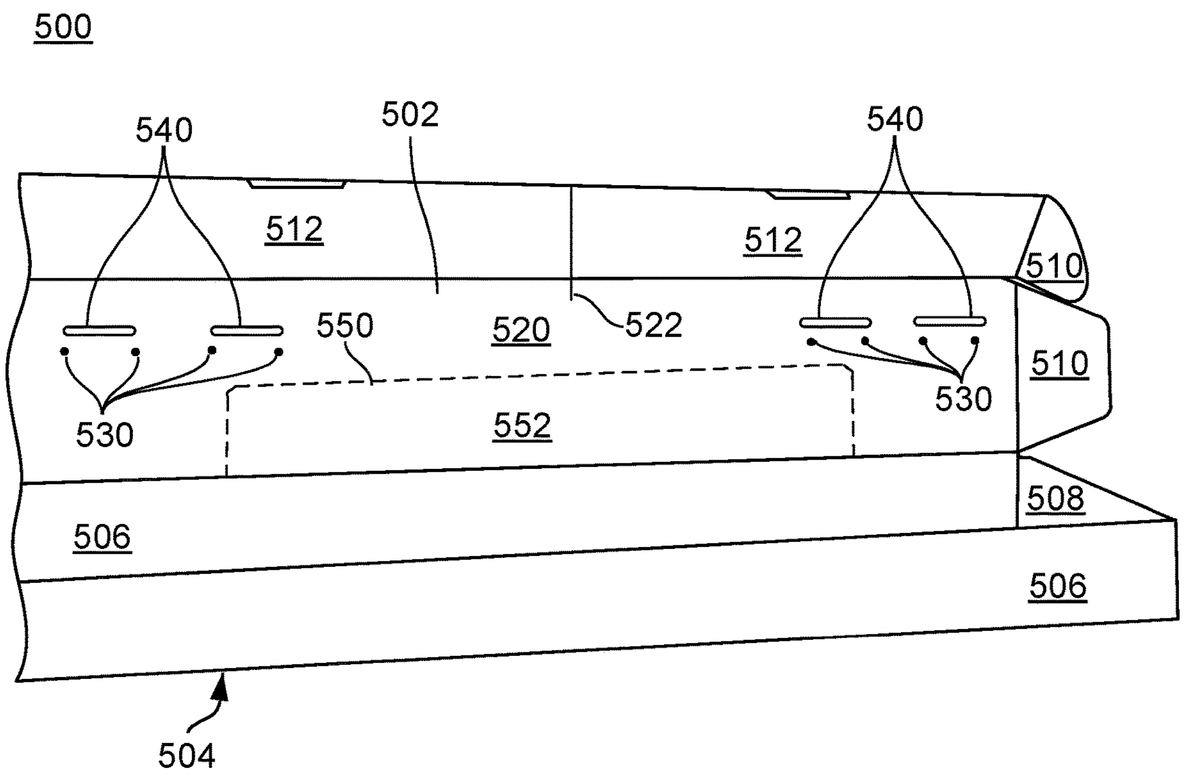

FIG. 5 is a cut-away isometric view of an open carton having a drill template located on an inner surface of a top panel in accordance with another embodiment.

Figure 6:
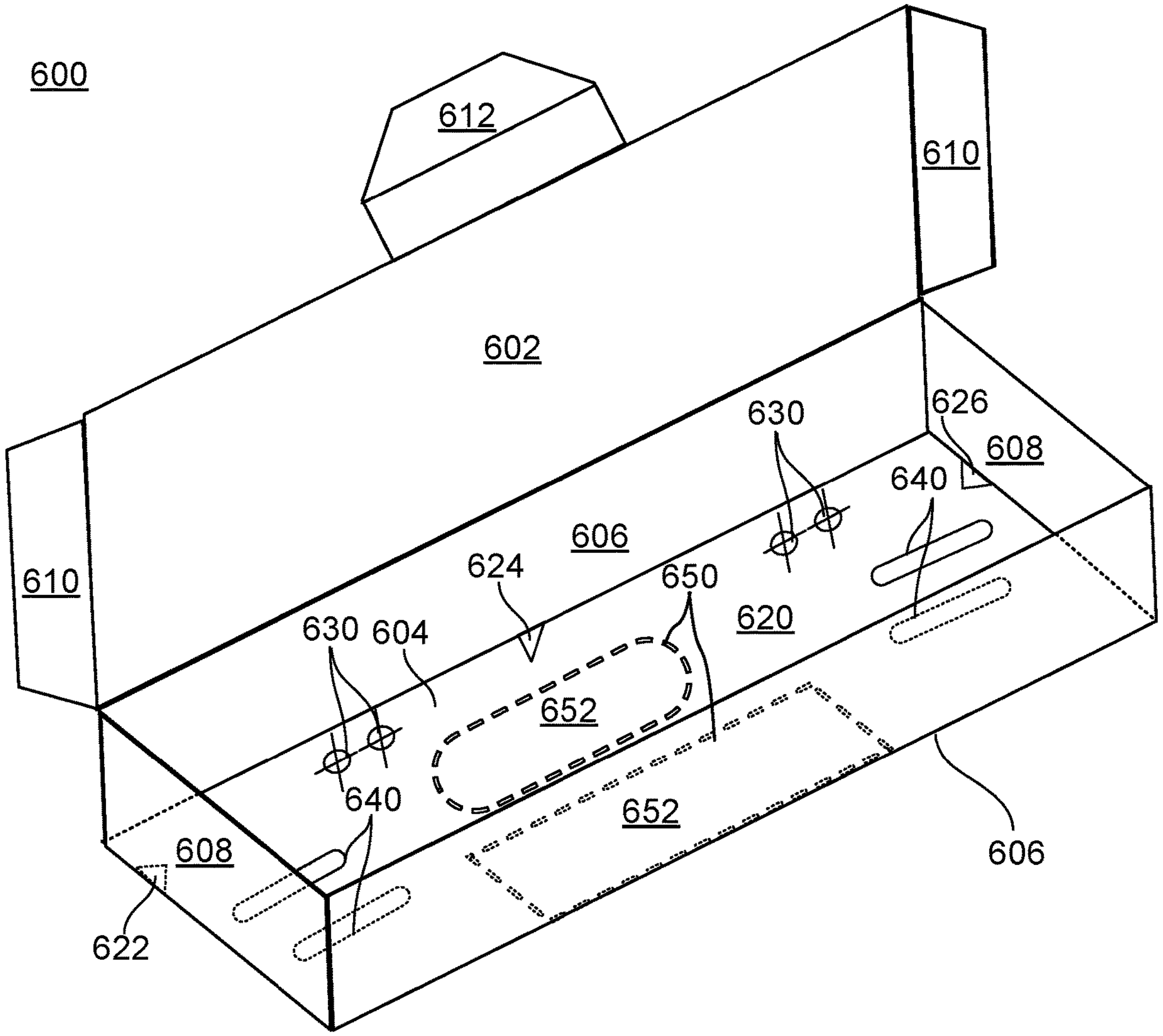

FIG. 6 is an isometric view of an open carton having a drill template located on an inner surface of a bottom panel in accordance with yet another embodiment.

DETAILED DESCRIPTION OF THE INVENTION

The present embodiments provide a carton having a drill template located on a surface of a panel of the carton.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

LIST OF REFERENCE NUMBERS FOR THE MAJOR ELEMENTS IN THE DRAWING

The following is a list of the major elements in the drawings in numerical order.

100 Carton
102 Top Panel
104 Bottom Panel
106 Side Panel
108 End Panel
110 End Flap
112 Closure Flap
120 Drill Template
122 Vertical Alignment V-shaped Notch or Marking
124 Horizontal Alignment V-shaped Notch or Marking
126 Vertical Alignment V-shaped notch or Marking
130 Drill or Cut Marking
140 Cutout
150 Perforation
152 Removable Area
160 Dust and Debris Path
180 Adhesive Elements
500 Carton
502 Top Panel
504 Bottom Panel
506 Side Panel
508 End Panel
510 End Flap
512 Closure Flap
520 Drill Template
522 Alignment Marking
530 Drill or Cut Marking
540 Cutout
550 Perforation
552 Removable Area
600 Carton
602 Top Panel
604 Bottom Panel
606 Side Panel
608 End Panel
610 End Flap
612 Closure Flap
620 Drill Template
622 Vertical Alignment V-shaped notch or Marking
624 Horizontal Alignment V-shaped notch or Marking
626 Vertical Alignment V-shaped notch or Marking
630 Drill or Cut Marking
640 Cutout
650 Perforation
652 Removable Area

MODE(S) FOR CARRYING OUT THE INVENTION

The embodiment described are herein in the context of a carton having a drill template located on a panel of the carton but are not limited thereto, except as may be set forth expressly in the appended claims.

Referring first to FIGS. 1-4, a carton 100 having a drill template 120 located on a surface of a panel is shown according to an embodiment. The arrangement and relative dimensions of the carton described are merely an example, as cartons having other configurations and/or other dimensions are also within the scope of the embodiments.

FIG. 1 is an isometric view of the carton 100 showing the carton 100 opened. The carton 100 includes a top panel 102 and a bottom panel 104. A pair of opposing side panels 106 extend between the top panel 102 and the bottom panel 104. A pair of opposing end panels 108 extend between the side panels 106 as well as between the top panel 102 and the bottom panel 104. A pair of end flaps 110 extend from opposite ends of the top panel 102 and are configured to slide against the inner surfaces of the end panels 108 when the top panel 102 is moved to close the carton 100. A closure flap 112 extends from a portion of an edge of the of the top panel 102 and is configured to slide against a region of the inner surface of a corresponding side panel 106 when closing the carton 100.

A drill template 120 is located on an inner surface of the top panel 102 according to the embodiment. FIG. 2 shows an enlarged view of the top panel 102 with the drill template 120 located thereon. The drill template 120 includes one or more alignment features, such as vertical alignment features 122, 126 and horizontal alignment feature 124. The drill template 120 further includes one or more drill or cut markings 130 and may include one or more cutouts 140. Also, the drill template 120 may include perforations 150 which may define one or more removable areas 152.

The vertical alignment features 122, 126 and the horizontal alignment feature 124 may be V-shaped notches that may be pre-cut into the top panel 102. When the V-shaped notches are pre-cut, each one may be covered with a clear plastic material to protect the contents of the carton 100 during shipping, and the clear plastic material may be removable. Alternatively, vertical alignment features 122, 126 and the horizontal alignment feature 124 may be perforations in the top panel 102 which may be configured for removal. As a further alternative, the vertical alignment features 122, 126 and the horizontal alignment feature 124 may be printed markings on the inner surface of the top panel 102, such as in the shape of a V-shaped notch or other feature, to be cut before use.

To align the drill template 120, an outer surface of the top panel 102 of the carton 100 may be placed against a mounting surface, such as against a wall or ceiling. Then, the desired height for the drill template 120 may be determined using, for example, a tape measure to measure the height of the tip of the V-shaped notch of the horizontal alignment feature 124 and then adjust the height of the drill template 120 until the desired height is attained. Next, the drill template 120 is leveled using, for example, a level to adjust the position and tilt of the drill template 120 until the tips of the V-shaped notches of the vertical alignment features 122, 126 are at a same height. A pencil or other implement may then be used to mark the locations of the tips of the V-shaped notches on the mounting surfaces.

Though three alignment features 122, 124, 126 are shown in the particular arrangement in FIGS. 1-2, the embodiment is not limited thereto. Other numbers of and/or arrangements of alignment features are also within the scope of the embodiments.

Printed markings 130 are provided at selected positions on the drill template 120. The printed markings 130 identify locations where a drill hole or a cut is to be made through the printed marking and into the mounting surface and where, for example, a screw is to be subsequently driven into that drill hole when the display, speaker or other product is subsequently installed.

Though four such printed markings 130 are shown in FIGS. 1-2, any number of such markings may be present in the drill template 120 and are within the scope of the embodiment.

Cutouts 140 may also be provided at pre-selected locations in the drill template 120 and may alternatively be used to align and level the drill template 120 against the mounting surface.

Perforations 150 may also be provided in the drill template 120 to define removable areas 152 which may be removed from the drill template 120 to provide access to the mounting surface.

FIG. 3 is another isometric view of the carton 100 showing the carton 100 opened and in which like elements as in FIGS. 1-2 also have the same reference numerals in FIG. 3.

FIG. 3 illustrates another feature of the carton 100 having the drill template 120. Ordinarily, when cuts or drill holes are made into a mounting surface, dust or debris generated by the drilling or cutting can collect on a floor or other surface below. However, in accordance with the embodiment, when the outer surface of the top panel 102 is placed against the mounting surface, and the markings 130 in the drill template 120 on the inner surface of the top surface 102 of the carton 100 are used to identify where the cuts or drill holes are to be made in the mounting surface, the dust or debris generated by the drilling or cutting into the mounting surface falls into the carton 100, such as, for example, by traversing along paths 160 into the carton 100. Thus, the use of the drill template 102 enables the dust or debris to collect within the carton rather than on a floor or other surface when cuts or drill holes are made in the mounting surface.

FIG. 4 is an isometric view of the carton 100 in which like elements as in FIGS. 1-3 also have the same reference numerals in FIG. 4. The carton 100 is shown closed to show an outer surface of the top panel 102 in which adhesive elements 180, which may be adhesive strips, may be provided and have a removable protective surface which protects the adhesive until needed.

When the drill template 120 is to be used, the carton 100 is opened, and the product therein removed if not done previously. Then, the protective surfaces of the adhesive elements 180 may be removed by the customer or installer and the outer surface of the top panel 102 are held loosely against the mounting surface, without the adhesive contacting the mounting surface. The three alignment features 122, 124, 126 or the cutouts 140 shown in FIG. 2 are then used to align the drill template 120 to the mounting surface.

After the drill template 120 is aligned to the mounting surface, the customer or installer presses the adhesive elements against the mounting surface to affix the outer surface of the top panel 102 of the carton 100 to the mounting surface. The customer or installer can then use the affixed drill template 120 to mark the locations where holes are to be drilled or cuts are to be made, and may then drill the holes or make the cuts in the mounting surface.

FIG. 5 is a cut-away isometric view of an opened carton 500 having a drill template 520 located thereon according to another embodiment.

The carton 500 includes a top panel 502 and a bottom panel 504. A pair of opposing side panels 506 extend between the top panel 502 and the bottom panel 504. An end panel 508 and another end panel (not shown) each extend between the side panels 506 as well as between the top panel 502 and the bottom panel 504. An end flap 510 and another end flap (not shown) each extend from opposite ends of the top panel 502 and are configured to slide against the inner surfaces of the end panels when the top panel 502 is moved to close the carton 500. A closure flap 512 extends from an edge of the of the top panel 502 and is configured to slide against a region of the inner surface of a corresponding side panel 506 when closing the carton 500.

The drill template 520 is located on an inner surface of the top panel 502 according to the embodiment and is configured to conform to the outline of a wall bracket. The drill template 520 includes a horizontal alignment feature 522.

Four pairs of printed markings 530 are provided and correspond to the drill hole locations on the wall bracket. That is, the drill hole locations correspond to locations on a wall where screws are to be subsequently driven into the drill holes to mount the wall bracket.

Cutouts 540 are provided at pre-selected locations in the drill template 520 and may be used to align and level the drill template 520 against the wall.

Perforations 550 are also be provided in the drill template 520 to define a removable area 552 which may be removed from the drill template 520 to provide access to the wall.

Adhesive elements (not shown) may also be provided on an outer surface of the top panel 502 to affix the carton to the wall while the drill template 520 is used to drill holes or make cuts in the wall.

FIG. 6 is an isometric view of a carton 600 having a drill template 620 located thereon according to yet another embodiment in which the drill template 620 is located on an inner surface of a bottom panel 604 of the carton 600.

The carton 600 is shown opened. The carton 600 includes a top panel 602 and the bottom panel 604. A pair of opposing side panels 606 extend between the top panel 602 and the bottom panel 604. A pair of opposing end panels 608 extend between the side panels 606 as well as between the top panel 602 and the bottom panel 604. A pair of end flaps 610 extend from opposite ends of the top panel 602 and are configured to slide against the inner surfaces of the end panels 608 when the top panel 602 is moved to close the carton 600. A closure flap 612 extends from a portion of an edge of the of the top panel 602 and is configured to slide against a region of the inner surface of a corresponding side panel 606 when closing the carton 600.

The drill template 620 includes one or more alignment features such as horizontal alignment feature 624 and vertical alignment features 622, 626. The drill template 620 further includes one or more drill or cut markings 630 and may include one or more cutouts 640. Also, the drill template 620 may include perforations 650 which may define one or more removable areas 652.

The vertical alignment features 622, 626 and the horizontal alignment feature 624 may be V-shaped notches that may be pre-cut into the bottom panel 604. When the V-shaped notches are pre-cut, each one may be covered with a clear plastic material to protect the contents of the carton 600 during shipping, and the clear plastic material may be removable. Alternatively, the vertical alignment features 622, 626 and the horizontal alignment feature 624 may be perforations in the top panel 602 which may be configured for removal. As a further alternative, the vertical alignment features 622, 626 and the horizontal alignment feature 624 may be printed markings on the inner surface of the top panel 602, such as in the shape of a V-shaped notch or other feature, to be cut before use.

To align the drill template 620, an outer surface of the bottom panel 604 of the carton 600 may be placed against the mounting surface, which may be a horizontal surface such as a tabletop or countertop. Then, the desired height and level may be determined. A pencil or other implement may then be used to mark the locations of the tips of the V-shaped notches on the mounting surfaces.

Though three alignment features 622, 624, 626 are shown in the particular arrangement in FIG. 6, the embodiment is not limited thereto. Other numbers of and/or arrangements of alignment features are also within the scope of the embodiments.

Printed markings 630 are provided at selected positions on the drill template 620. The printed markings 630 identify locations where a drill hole or a cut is to be made through the printed marking and into the mounting surface and where, for example, a screw is to be subsequently driven into that drill hole when the display, speaker or other product is subsequently installed.

Though four such printed markings 630 are shown in FIG. 6, any number of such markings may be present in the drill template 620 and are within the scope of the embodiment.

Cutouts 640 may also be provided at pre-selected locations in the drill template 620 and may alternatively be used to align and level the drill template 620 against a mounting surface.

Perforations 650 may also be provided in the drill template 620 to define removable areas 652 which may be removed from the drill template 620 to provide access to the mounting surface.

By providing the drill template 620 on the inner surface of the bottom panel 604 of the carton 600, the drill template 620 may be used, for example, on a horizontal surface such as a tabletop or countertop. At the same time, by the drill template 620 being located within the carton, the carton 600 may still be used to collect dust and debris produced during drilling or cutting.

In this manner, the embodiments provide a drill template for facilitating the mounting of a product in which the drill template is located on a surface of the same carton in which the product is shipped. Thus, the number of materials shipped with the product is reduced, and the risk of losing or misplacing the drill template is also reduced. Further, by locating the drill template on an inner surface of a panel of the carton, the carton can collect dust or debris generated during drilling or cutting using the drill template.

INDUSTRIAL APPLICABILITY

To solve the aforementioned problems, the present embodiments provide a shipping carton having a drill template located on a surface of a panel of the carton.

It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described as being in particular combinations, each feature or element may be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus, the embodiments are capable of many variations in detailed implementation that may be derived from the description contained herein by a person skilled in the art. No element, act, or instruction used in the description of the present application should be construed as critical or essential to the embodiments unless explicitly described as such. Also, as used herein, the article "a" is intended to include one or more items.

In addition, the above disclosed methods are not meant to limit the aspects of the embodiments, or to suggest that the aspects of the embodiments should be implemented following the aforementioned methods. The purpose of the aforementioned methods is to facilitate the understanding of one or more aspects of the embodiments and to provide the reader with one or many possible implementations of the processed discussed herein. It should be understood by one of ordinary skill in the art that the steps of the aforementioned methods may be performed in a different order and that some steps may be eliminated or substituted.

All United States patents and applications, foreign patents, and publications discussed above are hereby incorporated herein by reference in their entireties.

ALTERNATE EMBODIMENTS

Alternate embodiments may be devised without departing from the spirit or the scope of the embodiments.

What is claimed is:

1. A carton for holding at least one product and for facilitating mounting of the product, the carton comprising:

(a) a plurality of panels enclosing an interior of the carton, at least one panel of the plurality of panels including (1) an inner surface that faces the interior of the carton, and including (A) a drill template disposed on the inner surface of the at least one panel, the drill template including (i) at least one alignment feature by which the drill template is alignable to a mounting surface upon which the product is to be mounted, and (ii) at least one indicator of a drilling or cutting location, and (2) an opposing outer surface that faces an exterior of the carton, and including (A) at least one adhesive element disposed on the outer surface and facing the exterior of the carton by which the carton is removably affixable to the mounting surface, the at least one adhesive element being disposed at a location other than that of the at least one alignment feature;

(b) wherein (1) the carton is configured to hold the product and, upon removal of the product from the carton, the drill template disposed on the inner surface of the at least one panel and the at least one adhesive element disposed on the outer surface of the at least one panel combine to enable the carton to also serve as a removably affixable guide for drilling or cutting into the mounting surface.

2. The carton of claim 1, wherein (a) the at least one indicator of the drilling or cutting location is at least one of a marking, an opening, or a removable region on the drill template.

3. The carton of claim 1, wherein (a) the at least one indicator of the drilling or cutting location comprises a plurality of indicators on the drill template which correspond to a plurality of drilling or cutting locations.

4. The carton of claim 1, wherein (a) the at least one alignment feature is at least one of a vertical alignment feature or a horizontal alignment feature.

5. The carton of claim 1, wherein (a) the at least one alignment feature comprises a plurality of alignment features by which the drill template is alignable to a corresponding plurality of locations on the mounting surface.

6. The carton of claim 1, wherein (a) the at least one alignment feature includes at least one of a notch, a marking, or an edge.

7. The carton of claim 1, wherein (a) the at least one panel is a top panel of the carton, and (b) the drill template is disposed on an inner surface of the top panel.

8. The carton of claim 7, wherein (a) the opposing outer surface is an outer surface of the top panel, and (b) the carton is configured to hold the product and, upon removal of the product from the carton, the drill template disposed on the inner surface of the top panel and the at least one adhesive element disposed on the outer surface of the top panel combine to enable the carton to also serve as a removably affixable guide for drilling or cutting into the mounting surface.

9. The carton of claim 1, wherein the drill template further comprises (a) at least one cutout location.

10. The carton of claim 1, wherein the drill template further comprises (a) at least one perforation surrounding a removable region of the drill template.

11. The carton of claim 1, wherein (a) the at least one panel is a bottom panel of the carton, and (b) the drill template is disposed on an inner surface of the bottom panel.

12. The carton of claim 11, wherein (a) the opposing outer surface is an outer surface of the bottom panel, and (b) the carton is configured to hold the product and, upon removal of the product from the carton, the drill template disposed on the inner surface of the bottom panel and the at least one adhesive element disposed on the outer surface of the bottom panel combine to enable the carton to also serve as a removably affixable guide for drilling or cutting into the mounting surface.

13. The carton of claim 1, wherein (a) the at least one alignment feature is a notch, and (b) the notch is covered with a clear material.

14. The carton of claim 1, further comprising (a) a removable protective surface disposed on the at least one adhesive element.

15. A carton for holding at least one product and for facilitating mounting of the product, the carton comprising:

(a) a plurality of panels enclosing an interior of the carton, a top panel of the plurality of panels including (1) an inner surface that faces the interior of the carton, and including (A) a drill template disposed on the inner surface of the top panel of the plurality of panels, the drill template including (i) at least one alignment feature by which the drill template is alignable to a mounting surface upon which the product is to be mounted, and (ii) at least one indicator of a drilling or cutting location on the mounting surface, and (2) an opposing outer surface that faces an exterior of the carton, and including (A) at least one adhesive element disposed on the outer surface of the top panel and facing the exterior of the carton by which the carton is removably affixable to the mounting surface, the at least one adhesive element being disposed at a location other than that of the at least one alignment feature;

(b) wherein (1) the carton is configured to hold the product and, upon removal of the product from the carton, the drill template disposed on the inner surface of the top panel and the at least one adhesive element disposed on the outer surface of the top panel combine to enable the carton to also serve as a removably affixable guide for drilling or cutting into the mounting surface as well as serve as a removably affixable receptacle to receive debris generated during the drilling or cutting into the mounting surface.

16. The carton of claim 15, wherein (a) the at least one alignment feature is a notch, and (b) the notch is covered with a clear material.

17. The carton of claim 15, further comprising (a) a removable protective surface disposed on the at least one adhesive element.

18. A carton for holding at least one product and for facilitating mounting of the product, the carton comprising:

(a) a plurality of panels enclosing an interior of the carton, the plurality of panels including a top panel, a bottom panel, a pair of opposing side panels disposed between the top panel and the bottom panel, and a pair of opposing end panels disposed between the top panel and the bottom panel and between pair of opposing side panels, the top panel of the plurality of panels including (1) an inner surface that faces the interior of the carton, and including (A) a drill template disposed on the inner surface of the top panel, the drill template including (i) at least one horizontal alignment feature by which the drill template is alignable horizontally to a mounting surface upon which the product is to be mounted, (ii) at least one vertical alignment feature by which the drill template is alignable vertically to the mounting surface, (iii) a plurality of indicators identifying a corresponding plurality of drilling or cutting locations on the mounting surface, each one of the plurality of indicators being at least one of a marking, an opening, or a removable region, (iv) a plurality of cutout locations, and (v) a plurality of perforations each surrounding a corresponding removable region of the drill template; and (2) an opposing outer surface that faces an exterior of the carton, and including (A) at least one adhesive strip located on the outer surface of the top panel and facing the exterior of the carton by which the carton is removably affixable to the mounting surface, the at least one adhesive element being disposed at a location other than those of the at least one horizontal alignment feature and the at least one vertical alignment feature;

(d) wherein (1) the carton is configured to hold the product and, upon removal of the product from the carton, the drill template disposed on the inner surface of the top panel and the at least one adhesive element disposed on the outer surface of the top panel combine to enable the carton to also serve as a removably affixable guide for drilling or cutting into the mounting surface at the locations of the plurality of indicators as well as serve as a removably affixable receptacle to receive debris generated during the drilling or cutting into the mounting surface.

19. The carton of claim 18, wherein (a) the at least one alignment feature is a notch, and (b) the notch is covered with a clear material.

20. The carton of claim 18, further comprising (a) a removable protective surface disposed on the at least one adhesive element.

* * * * *